April 8, 1969  A. WINER  3,437,549
PROCESS FOR FILLING EXTERNAL STRUCTURAL VOIDS IN SUBMARINES
AND THE RESULTING ARTICLE
Filed May 28, 1964

INVENTOR.
ALLEN WINER
BY
*Hodges*
ATTY.

United States Patent Office 3,437,549
Patented Apr. 8, 1969

3,437,549
PROCESS FOR FILLING EXTERNAL STRUCTURAL VOIDS IN SUBMARINES AND THE RESULTING ARTICLE
Allen Winer, 603 Marcia Lane, Rockville, Md. 20851
Filed May 28, 1964, Ser. No. 371,148
Int. Cl. B32b 15/08, 27/40
U.S. Cl. 161—43                                    7 Claims

ABSTRACT OF THE DISCLOSURE

A method for filling external structural voids in the construction of submersible vehicles and the resulting article comprising the steps of filling a void with a heat curable resin; heating the external skin of the void to effect curing of a thin internal layer in intimate contact with the skin within the void; pouring out the uncured portion of the resin; filling the central portion with a low density core material which expands to form a rigid core; plugging the apertures with an ambient temperature curing material; and welding cover plates over the apertures of the void.

The invention described herein may be manufactured and used by or for the Government of the United States of America for governmental purposes without the payment of any royalties thereon or therefor.

The present invention relates to deep submersible vehicles and more particularly to improved methods for filling external structural voids in the construction of submersible vehicles to form an improved structure.

In the construction of deep submersible vehicles such as submarines, portions of the vehicles are constructed in the form of hollow bodies having an external metal skin. These hollow bodies in the case of a submarine include appendages such as rudders, sail planes, stern planes, stabilizers, and transition cones. In the case of an unmanned submersible vehicle, the hollow body may consist of the entire structure or portions thereof. Weight being the primary concern in the fabrication of submarines, the problem is to fill these hollow bodies or voids with materials which will not increase the weight of the ship inordinately and at the same time provide a rigid supporting structure for the steel skin of the submarine having high net buoyancy and water tight integrity when exposed to high hydrostatic pressure.

It has been the general practice to entirely fill these external structural voids with a combination of wood and pitch, polyurethane foam or syntactic foam. Although the resulting construction has served the purpose, it has not proved satisfactory for all conditions of service and a great amount of time is expended in filling these voids. Occasionally, after periods of use, cracks develop in the steel skins of submarines at joints where the steel plates have been welded together. When the submarine is operating, water enters the filled voids through the cracks and due to the high hydrostatic pressures developed at the varying ocean depths, the water is absorbed by the filler material thereby increasing the weight of the submarine which in some instances could result in damage to the submarine.

Of the type of fillers used in the construction of submarines, the wood and pitch combination and polyurethane foam are objectionable because each filler will absorb prohibitive amounts of water when exposed to high hydrostatic pressure. The wood and pitch method for filling voids is also unsatisfactory because the installation procedure is time-consuming, tedious and expensive.

Syntactic foams, which are foams composed of resinous matrices incorporating low density fillers, wherein buoyancy is achieved by virtue of the filler rather than gaseous expansion, are also objectionable despite their very low water absorption under high hydrostatic pressure. A filler of the syntactic foam type generates a high exotherm which leads to cracking and considerable shrinkage on cooling. In order to compensate for previous shrinkage and cracks, additional unfilled catalyzed resin must be introduced into the void and the additive resin being of a higher density than the syntactic foam increases the density of the entire filler mass. Since weight is a very critical consideration for submarines, the added weight is highly undesirable.

Another objection to the use of syntactic foam for entirely filling voids is that the filling process is extremely slow. An FBM type submarine requires approximately 2000 cu. ft. of external structural voids to be filled and the present syntactic foam filling procedure requires a pour not to exceed 6″ in depth, waiting two hours between pours, then pouring an additional 6″ depth. After one shift of pouring, eight hours are allowed to elapse before pouring is resumed. Another reason for the slow filling process is that present mixing equipment for syntactic foam is necessarily limited to a two cubic foot cement mixer cycle, because of the high exotherms developed in bulk. Polyurethane foam, however, is speedier to install. A machine can produce uniform foam at the rate of 30 to 35 pounds per minute of 22 lb./cu. ft. density, which means that a void can be filled at the rate of 100 cu. ft./hr. Even though the polyurethane foam is speedier to install, the foam still has objectionable water absorption characteristics under high submergence pressures.

The general purpose of this invention is to provide an improved method of filling external voids in submarines with speed, low cost, and ease of installation and wherein the resulting structure provides high net buoyancy, a high degree of safety, and maximum retention of buoyancy under high hydrostatic pressure.

Accordingly, an object of the present invention is the provision of an improved process for accelerating external structural void filling for submarines.

Another object of this invention is to provide a filled void of safe construction and light weight.

A further object is to fill an external structural void with a dilaminar fill.

The exact nature of this invention as well as other objects and advantages thereof will be readily apparent from consideration of the following specification relating to the annexed drawing in which.

Figure 1:
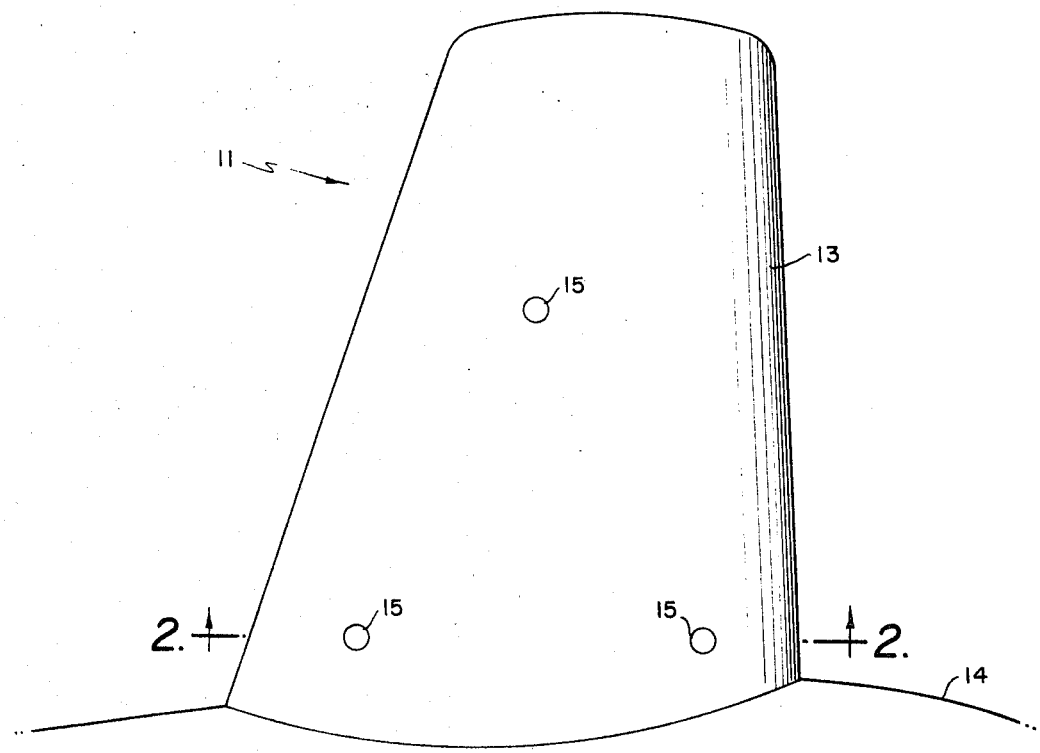
FIG. 1 is a pictorial view of a typical submarine appendage.

A typical submarine appendage is illustrated in FIG. 1 indicated as 11, which consists essentially of a steel frame 13 extending from and welded to a main portion of the submarine 14. A plurality of ports or apertures 15 are provided in the steel skin for the introduction and removal of the filler materials. Some of the ports are also used as vent holes during the filling of the void with the materials in order to avoid large void areas during those portions of the filling operation.

Figure 2:
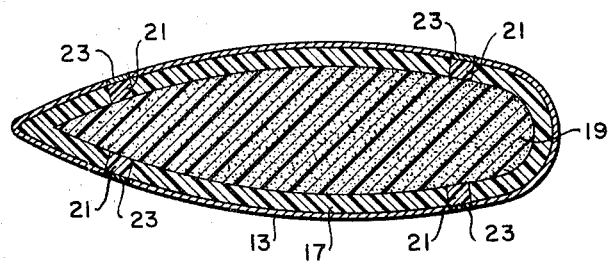
FIG. 2 is a sectional view of FIG. 1 taken substantially as indicated along line 2—2 of FIG. 1 showing the external steel skin, the layer of low water absorption material, and the core material. The thickness of the layer has been exaggerated in the drawing for the sake of clarity.

The methods of this invention contemplate a dilaminar fill as shown in FIG. 2, which is a transverse cross sectional view of the appendage of FIG. 1. The structure includes an outer steel skin 13, a water-tight layer 17 and a low density core 19 of polyurethane foam.

One method of fabricating the submarine appendage is essentially as follows: The external void is preheated and the void is entirely filled through the entry ports 15 with a heat gelling vinyl resin liquid system. The vinyl resin system preferably contains a heat polymerizable monomer for increasing the stiffness of the gelled resinous layer after heat curing. The system may also contain a syntactic filler for lowering the density of the vinyl resin mixture. Upon the continuous application of heat to the steel skin, that part of the vinyl resin mixture in contact with the heated steel plates will form a rigid layer, the thickness of which is dependent upon the amount of heat applied and the length of contact with the heat source. By way of example and not by way of limitation, the thickness of the layer in some applications may be ⅛". This type of construction, i.e., the forming of a plastic envelope, assures that the vinyl layer is in intimate and continuous contact with the steel plates of the void.

After a sufficient layer of the filler has gelled, the excess ungelled vinyl filler is removed from the void through the exit ports 15. The removal may be accomplished by either a gravity flow or by a pumping action. Since the vinyl formulation requires a heat curing cycle to convert it to a rigid mass, there is virtually no danger of the excess vinyl filler solidifying at ambient temperatures. Therefore, the excess filler can be stored and can be repeatedly used in the filling of other voids.

Heat is continuously applied to the external steel plates around the void to be filled until a complete cure of the vinyl envelope has been effected. The heat is then removed and an inspection of the cured layer is made to check on thickness and continuity of the deposit and whether the deposit is free of cracks.

After the continuity determination is made, a low density polyurethane foam of adequate structural strength, but approximately one half the density of the vinyl layer is subsequently introduced into the void to form the rigid core of the structural void filler. The polyurethane expands and forms a bond with the vinyl layer. The ports 15 are then filled with a polyester 21 or epoxy filler material which can be made thixotropic if desired and which is ambient temperature curing, in order to maintain the continuity of the watertight envelope around the entire void. Finally steel cover plates 23 as shown in FIG. 2 are welded in place to form a continuous steel skin for the structure, which is then ready for use under high hydrostatic pressure.

Another method of fabrication which might be called an encapsulation process comprises steps similar to those of the method discussed above. The void is filled with an epoxy resin, vinyl resin, or polyester resin containing a suitable catalyst. The catalyst is placed in capsules which are then mixed throughout the resin system. The capsule forms a protective coating around the catalyst and prevents the catalyst from reacting with the resin. Heat is externally applied to the steel plates and the heat causes the protective covering on the catalyst nearest to the steel plates to dissolve. Upon dissolution of the covering, the catalyst racts with resin thereby forming a rigid layer of solidified resin in intimate and continuous contact with the steel plates. After a layer of sufficient thickness is deposited, the heat is removed and the unreacted mixture is drained from the appendage through the ports 15 in the steel covering 13. The unreacted mixture may be stored and used again as was the case with the vinyl mixture of the previous method.

Polyurethane foam is then poured into the partially filled void and allowed to expand thereby forming a rigid core of low density in intimate contact with the solidified resinous layer and bonded thereto. The ports 15 are then filled with a filler material 21 to maintain the continuity of the resinous layer around the core material. Steel cover plates 23 are then welded into place and the steel outer structure becomes continuous, thereby completing the fabrication of the appendage.

A further method of fabrication, similar to the previously discussed methods includes the use of an epoxy or polyester resin system having an additive amount of vinyl resin. The void is preheated and the epoxy or polyester resin system containing a suitable proportion of vinyl resin is introduced into the void, completely filling the void. By way of example and not by way of limitation, the additive vinyl resin in some applications may be about 10 percent by weight of the resin system. The system may also include a low density filler material to reduce the density of the entire system. The heat causes the vinyl resin to act as a gelling agent in the area adjacent the steel skin and a layer of gelled mixture is deposited in continuous and intimate contact with the steel skin except for the areas adjacent apertures. The ungelled mixture is then removed leaving an unfilled central portion and the exotherms developed by the base resins cause the layer to be cured. Polyurethane foam is introduced into the void to form a rigid core, ambient temperature curing filler material is placed in the apertures, and plates are welded in place in the manner set forth in the previously described methods.

Thus it is seen that an appendage is formed having high net buoyancy, sufficient structural strength, light weight and the ability to withstand high hydrostatic pressure without increasing its weight inordinately. Also, construction time is lessened considerably through the combination of filler materials and methods, i.e., the slower process of depositing a watertight layer and the speedier process of forming a rigid core of polyurethane foam for the appendage.

It is to be understood that the watertight layer 17 may be of any selected or desired thickness which will enable the layer to withstand the hydrostatic pressure to which it is exposed.

What is claimed is:

1. A method of filling an external structural void having a metal skin initially provided with a plurality of apertures therein, to form a light weight appendage for deep submersible vehicles capable of withstanding high hydrostatic pressure, comprising the steps of:

externally heating the metal skin;
   completely filling the void via the apertures in the skin with a heat curing filler material having low water absorption characteristics when exposed to high hydrostatic pressure, whereby the heat causes said material adjacent the inner surface of the metal skin to gell and to form a layer of material in intimate and continuous contact with the inner surface of the metal skin except for the areas adjacent the apertures in the skin and an ungelled central portion;
   removing the ungelled portion of said material via the apertures in the skin, thereby forming an unfilled central portion;
   curing said gelled layer by continuous heat application;
   filling the central portion via the apertures with a low density material which expands to form a rigid core bonded to the cured layer of material;
   filling the apertures with an ambient temperature curing filler material whereby the layer of material having low water absorption characteristics is made continuous; and
   welding cover plates over the apertures in the metal skin, whereby the metal skin of the appendage is made continuous.

2. The method according to claim 1 wherein the low density material consists of polyurethane foam.

3. The method of claim 1 wherein the heat curing filler material comprises:

a two part resin system wherein the catalyst is in meltable capsule form.

4. The method according to claim 1 wherein the mixture having low water absorption characteristics is vinyl resin system.

5. The method according to claim 4 wherein said vinyl resin system includes a heat polymerizable monomer.

6. The method according to claim 4 wherein said vinyl resin system includes a filler material of lower density than the density of the vinyl resin whereby the density of the entire vinyl resin system is reduced and a syntactic mixture is formed.

7. An appendage for deep submersible vehicles capable of withstanding high hydrostatic pressure comprising:
- an external skin of metal;
- a rigid layer of material having low water absorption characteristics when exposed to high hydrostatic pressure in intimate and continuous contact with the inner surface of said metal skin and bonded thereto; and
- a rigid core of a low density material bonded to said layer and providing structural strength for said appendage against the compressive forces of submergence pressures.

References Cited

UNITED STATES PATENTS

| | | | |
|---|---|---|---|
| 1,942,162 | 1/1934 | Campbell | 161—407 X |
| 2,106,840 | 2/1938 | Gould | 156—79 X |
| 2,108,212 | 2/1938 | Schellens. | |
| 2,802,766 | 8/1957 | Leverenz | 156—79 |
| 3,078,202 | 2/1963 | Bellanca et. al. | 161—271 |
| 3,080,267 | 3/1963 | Schmalz. | |
| 3,111,569 | 11/1963 | Rubenstein | 219—19 |

ROBERT F. BURNETT, *Primary Examiner.*

WILLIAM A. POWELL, *Assistant Examiner.*

U.S. Cl. X.R.

89—1; 161—125, 160, 186, 190, 214, 231; 114—.5; 117—95; 156—79; 264—45, 267